(12) United States Patent
Jungwirth et al.

(10) Patent No.: US 10,128,793 B2
(45) Date of Patent: Nov. 13, 2018

(54) COMPENSATION TECHNIQUE FOR SPATIAL NON-UNIFORMITIES IN SOLAR SIMULATOR SYSTEMS

(71) Applicant: The Boeing Company, Chicago, IL (US)

(72) Inventors: Douglas R. Jungwirth, Porter Ranch, CA (US); Philip T. Chiu, La Crescenta, CA (US); Ricardo Anaya, Pasadena, CA (US)

(73) Assignee: The Boeing Company, Chicago, IL (US)

(*) Notice: Subject to any disclaimer, the term of this patent is extended or adjusted under 35 U.S.C. 154(b) by 181 days.

(21) Appl. No.: 14/987,254

(22) Filed: Jan. 4, 2016

(65) Prior Publication Data

US 2017/0141726 A1  May 18, 2017

Related U.S. Application Data

(60) Provisional application No. 62/254,550, filed on Nov. 12, 2015.

(51) Int. Cl.
*G01R 31/26* (2014.01)
*H02S 50/15* (2014.01)
*F21S 8/00* (2006.01)

(52) U.S. Cl.
CPC ............ *H02S 50/15* (2014.12); *F21S 8/006* (2013.01)

(58) Field of Classification Search
CPC ............ G01R 31/2605; G01R 31/2656; G01R 31/405; G01R 31/2603; H01L 31/18; H01L 31/0322; H01L 31/03928; H01L 31/022466; H01L 31/022425; H01L 31/1884; H01L 31/073; H01L 31/0749; H01L 31/046; H01L 22/12; H01L 31/0236; H01L 22/26; H02S 50/10; H02S 50/15; G01N 21/66; G01N 21/9501; F21S 8/006;

(Continued)

(56) References Cited

U.S. PATENT DOCUMENTS 7,659,474 B2   2/2010   Joslin et al.
7,839,503 B2   11/2010  Jungwirth et al.
8,220,941 B2   7/2012   Jungwirth et al.

(Continued)

OTHER PUBLICATIONS

Rivola et al., "High-Speed Multi-Channel System for Solar Simulator Irradiance Non-Uniformity Measurement," 40th IEEE Photovoltaic Specialists Conference, 2014, pp. 2611-2615.

*Primary Examiner* — Thang Le
(74) *Attorney, Agent, or Firm* — Ostrager Chong Flaherty & Broitman P.C.

(57) ABSTRACT

An apparatus and methods for compensating for spatial non-uniformities in solar simulators. This is accomplished in part by acquiring a spatial map of the intensity distribution that the solar simulator produces across the illumination plane using a reference cell, identifying an area of an arbitrary solar cell within the illuminated area, and then calculating the expected illumination levels for that solar cell in that specific location based on the spatial mapping. The results of that process can then be used to determine the efficiency of the arbitrary solar cell during a test in which the reference cell (of known efficiency), located in a different part of the illuminating beam, simultaneously measures the illumination in one area of the illumination beam.

18 Claims, 12 Drawing Sheets

(58) Field of Classification Search
CPC ... F21V 9/02; G01B 11/0625; G01B 11/0616; G01B 11/0683
See application file for complete search history.

(56) References Cited

U.S. PATENT DOCUMENTS

| | | |
|---|---|---|
| 8,315,848 B2 | 11/2012 | Shimotomai |
| 8,439,530 B2 | 5/2013 | Jungwirth |
| 2004/0020529 A1* | 2/2004 | Schutt ..................... F21S 8/006 136/245 |
| 2010/0276571 A1* | 11/2010 | Wang ........................ G01J 1/08 250/205 |
| 2011/0127992 A1* | 6/2011 | Shimotomai ........... F21S 8/006 324/96 |
| 2011/0320145 A1* | 12/2011 | Horng ................ G01R 31/2605 702/65 |
| 2012/0248335 A1* | 10/2012 | Kim .................. G01N 21/9501 250/459.1 |
| 2014/0307411 A1 | 10/2014 | Jungwirth et al. |

\* cited by examiner

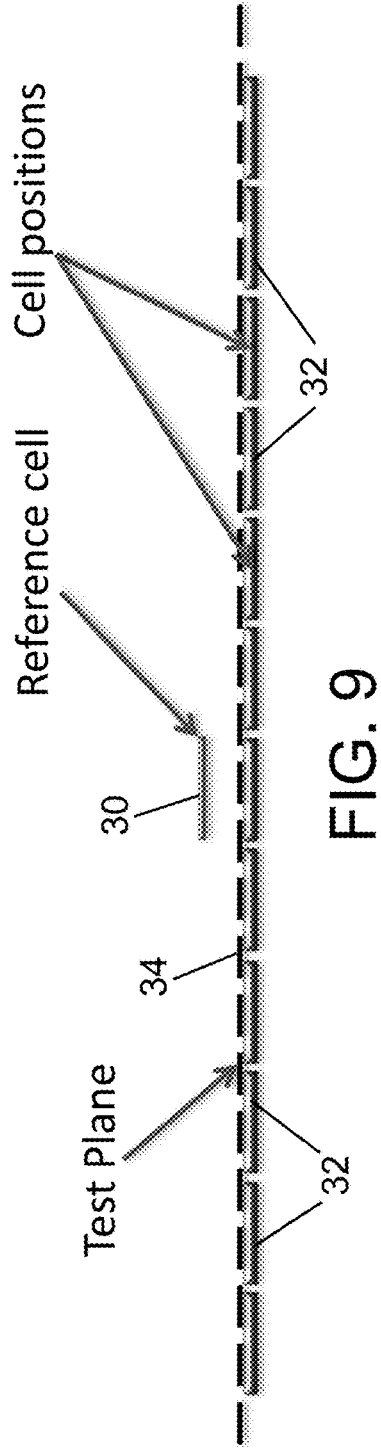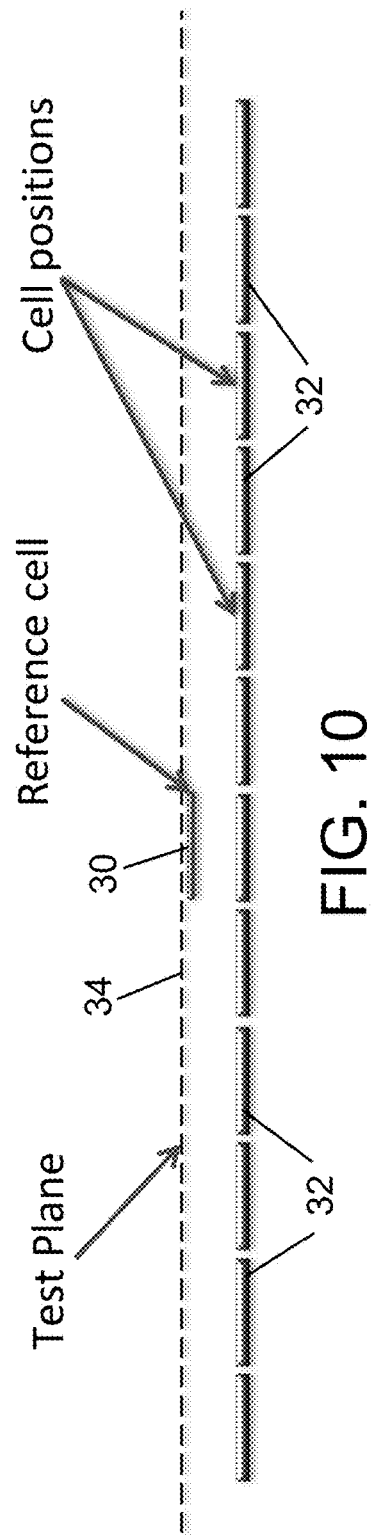

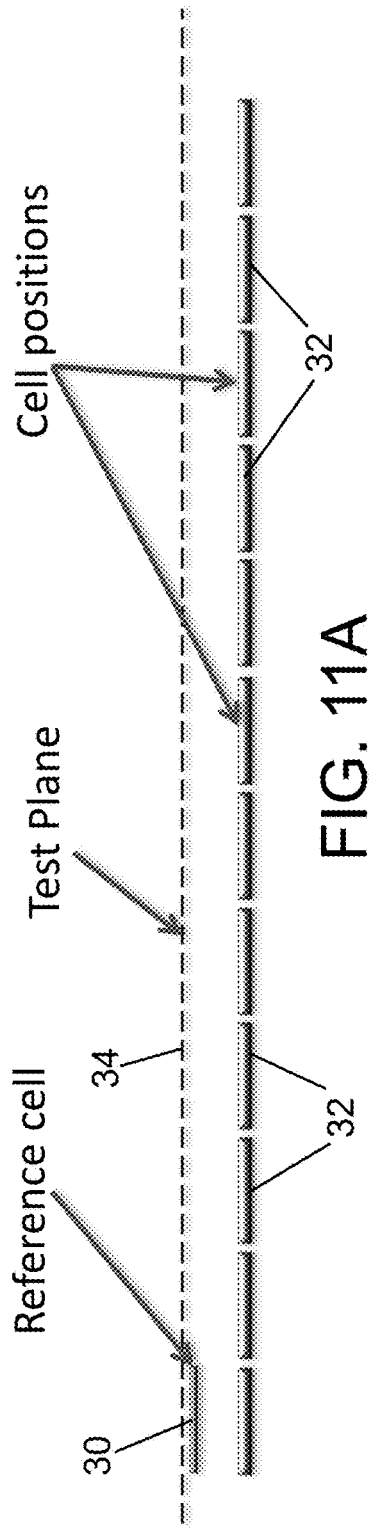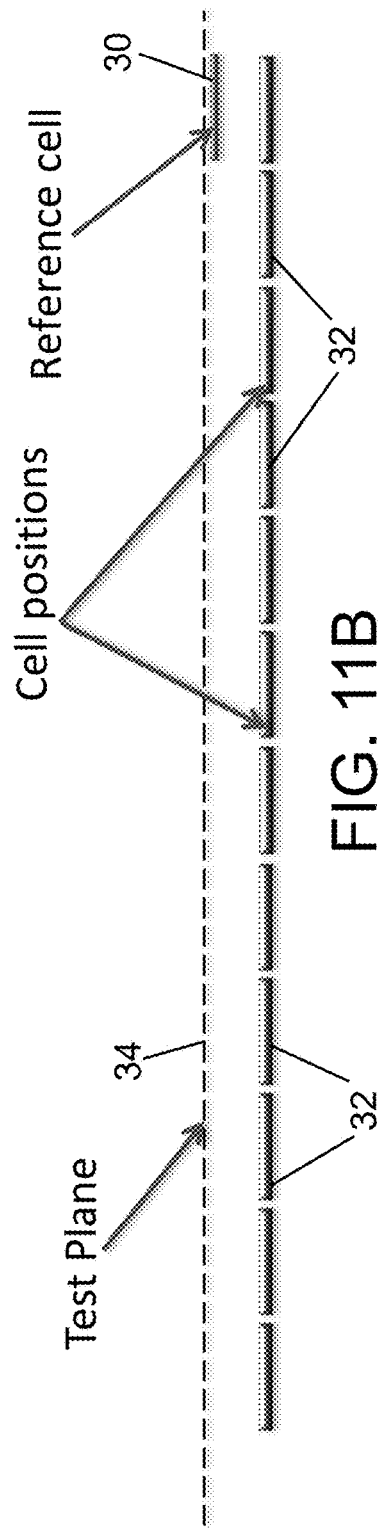

COMPENSATION TECHNIQUE FOR SPATIAL NON-UNIFORMITIES IN SOLAR SIMULATOR SYSTEMS

RELATED PATENT APPLICATION

This application claims the benefit, under Title 35, United States Code, § 119(e), of U.S. Provisional Application No. 62/254,550 filed on Nov. 12, 2015.

BACKGROUND

This disclosure generally relates to test equipment for photovoltaic cells and, more particularly, relates to solar simulator systems used in testing of solar (i.e., photovoltaic) cells.

Solar cells convert the sun's energy into useful electrical energy by way of the photovoltaic effect. Modern multi-junction solar cells operate at efficiencies significantly higher than traditional, silicon solar cells, with the added advantage of being lightweight. Therefore, solar cells provide a reliable, lightweight and sustainable source of electrical energy suitable for a variety of terrestrial and space applications.

During the design and manufacture of solar cells, there is often a need to test solar cells for power generation and overall operating efficiency. One option for testing solar cells is exposing the solar cells to natural sunlight, as if the solar cells were in deployment. However, for a variety of reasons, it is often not practical (or even feasible) to expose test solar cells to natural sunlight.

Thus, solar simulators have been developed as an alternative to testing solar cells with natural sunlight. Advantageously, solar simulators facilitate the indoor testing of solar cells under controlled laboratory conditions. Unlike solar cells designed for outer space applications, terrestrial solar cells can be exposed to sunlight that is "filtered" through different atmospheric and/or environmental conditions. Moreover, the altitude at which the solar cells will be deployed can influence the spectral (wavelength) characteristics of sunlight. Consequently, a solar simulator should be configured to provide accurate spectral adjustability to simulate different types of sunlight conditions.

Large-area solar simulators depend on spatial uniformity to make accurate and repeatable measurements of solar cells. However, solar simulators do not always provide a smooth illumination area for testing of large solar cells. This spatial non-uniformity causes errors to be created during the measurements of solar cells. This is particularly important when reference cells are used to compensate for temporal instabilities in the illuminating beam. (A reference cell is a calibrated photovoltaic or solar cell.)

One solar simulation system uses reference cells (located in a different part of the illuminating beam) to simultaneously measure the illumination in one area of the illuminating beam and assumes that illumination value is representative for the entire illuminating beam. Reference measurements are actively taken at one location in the illuminating beam and the solar cell under test (also referred to herein as "device under test (DUT)") is placed at a different part of the illuminating beam. Spectral balancing and absolute irradiance is "measured" by the reference cell and it is assumed that the solar cell under test has the same spectral balance and same absolute irradiance. When spectral filtering or focusing is done, the spatial distribution across the illumination plane changes and is not measured with this system. Misalignment or poor design can produce spatial non-uniformities of 5% and larger across the illuminated area at the illumination plane.

It would be desirable to provide means and methods for compensating for spatial non-uniformities in solar simulators.

SUMMARY

The subject matter disclosed in detail below is directed to apparatus and methods for compensating for spatial non-uniformities in solar simulators. This is accomplished in part by acquiring a spatial map of the intensity distribution that the solar simulator produces across the illumination plane using the reference cell, identifying an area of an arbitrary solar cell within the illuminated area, and then calculating the expected illumination levels for that solar cell in that specific location based on the spatial mapping. The results of that process can then be used to determine the efficiency of the arbitrary solar cell during a test in which the reference cell (of known efficiency), located in a different part of the illuminating beam, simultaneously measures the illumination in one area of the illuminating beam.

The methods disclosed in detail below comprise a mapping technique that uses a reference cell to measure the spatial non-uniformity of the intensity distribution within the illumination area of a solar simulator before any solar cells are tested. First, an X-Y scan across the entire illuminated area is performed using one or more reference cells. The measured values produced by the reference cell(s) are recorded as a function of position. Then an area of an arbitrary solar cell within the illuminated area is identified and the expected illumination levels for that solar cell in that specific location are calculated. These calculations are based in part on the measured values recorded during the spatial mapping using the reference cell. One reference cell can be used if the solar cell under test is a single-junction solar cell (e.g., silicon). Several different reference cells (also referred to herein as "isotypes") may be used if the solar cell under test is a multi-junction solar call.

The foregoing technique uses a small reference cell to plot out, with high spatial resolution, the spatial non-uniformity and then, based on the exact location and geometry of the solar cells under test (this can be done for several cells simultaneously), a computer calculates the predicted ratios compared to the results obtained from the calibrated reference cell. This enables a better prediction of the light intensity value at any location in the optical beam and allows this ratio to be calculated for any arbitrary solar cell under test in any arbitrary location within the optical beam.

The compensation method may further comprise a technique for calculating the expected illumination value of a reference cell that is not in the same plane as the plane of the solar cells under test.

One aspect of the subject matter disclosed in detail below is a method for compensating for spatial non-uniformities in a solar simulator, comprising: (a) projecting light from a light source onto an illumination area in a test plane; (b) calculating an intensity distribution of the light projected onto the illumination area in the test plane using a reference cell; (c) identifying a portion of the illumination area occupied by a first solar cell; and (d) calculating an expected current factor for the first solar cell based on at least data from the intensity distribution and data representing the portion of the illumination area occupied by the first solar cell. In accordance with some embodiments, step (b) comprises: placing the reference cell at an initial location within the illumination area; measuring the current produced by the reference cell at the initial location; placing the reference cell at successive locations within the illumination area; and measuring the current produced by the reference cell at each successive location. The successive locations are located in respective contiguous scan step areas formed by subdividing the illumination area. This method may further comprise: calculating a current density when the reference cell is located at the initial location; calculating a respective current density when the reference cell is located at each successive location; and dividing the current density at each successive location by the current density at the initial location of the reference cell, wherein the results of the dividing step for locations which at last partially overlap with the first solar cell are used to calculate the expected current factor.

The method described in the preceding paragraph may further comprise: (e) determining a portion of the illumination area occupied by a second solar cell; and (f) calculating an expected current factor for the second solar cell based on at least data from the intensity distribution and data representing the portion of the illumination area occupied by the second solar cell. The first and second solar cells may have different sizes and/or different shapes.

In some cases, the reference cell and the solar cell may be disposed at different levels relative to the test plane, in which case the method may further comprise: moving the light source from a first position whereat the test plane is level with the first solar cell to a second position whereat the test plane is level with the reference cell, wherein step (b) is performed while the light source is in the second position; moving the light source, subsequent to step (b), from the second position to the first position; measuring the current produced by the reference cell while the light source is in the first position and the reference cell is at the initial location; and while the reference cell is at the initial location, calculating a ratio of the respective currents produced by the reference cell while the light source is in the first and second positions respectively, wherein the expected current factor calculated in step (d) is also based in part on the ratio.

Another aspect of the subject matter disclosed in detail below is a method for compensating for spatial non-uniformities in a solar simulator, comprising: (a) projecting light from a light source onto an illumination area in a test plane; (b) identifying a portion of the illumination area occupied by a multi-junction solar cell; (c) calculating a first intensity distribution of light having wavelengths in a first range projected onto the illumination area in the test plane using a reference cell of a first type; (d) calculating a second intensity distribution of light having wavelengths in a second range different than the first range projected onto the illumination area in the test plane using a reference cell of a second type different than the first type; (e) calculating an expected current factor for the multi-junction solar cell based on at least data from the first and second intensity distributions and data representing the portion of the illumination area occupied by the first solar cell.

A further aspect is a solar simulator system comprising: a light source configured to generate an optical beam; optical elements disposed along a path of the optical beam, the optical elements being configured to direct the optical beam onto an illumination area in a test plane; a reference cell disposed along the path of the optical beam in or near the test plane; a device for measuring a current produced by the reference cell when illuminated by the optical beam; a scanning apparatus configured to scan the reference cell across the optical beam in a plane generally parallel to the test plane; and means for calculating an intensity distribution of light from the light source which impinges onto the illumination area in the test plane based on currents produced by the reference cell during scanning. In accordance with some embodiments, the system further comprises: means for identifying a portion of the illumination area occupied by a solar cell; and means for calculating an expected current factor for the solar cell based on at least data from the intensity distribution and data representing the portion of the illumination area occupied by the solar cell.

Yet another aspect is a solar simulator system comprising: a light source configured to generate an optical beam; optical elements disposed along a path of the optical beam, the optical elements being configured to direct the optical beam onto an illumination area in a test plane; a reference cell disposed along the path of the optical beam in or near the test plane; a device for measuring a current produced by the reference cell when illuminated by the optical beam; a scanning apparatus configured to scan the reference cell across the optical beam in a plane generally parallel to the test plane; and a computer system configured to be capable of performing the following operations: (a) controlling the light source to project light toward the optical elements; (b) controlling the scanning apparatus so that the reference cell is placed at an initial location and successive locations in a plane parallel to the test plane at successive times; (c) receiving measurement data representing measurements of current produced by the reference cell at the initial and successive locations; (d) calculating an intensity distribution of the light projected onto the illumination area in the test plane based on the measurement data; (e) identifying a portion of the illumination area occupied by a solar cell; and (f) calculating an expected current factor for the solar cell based on at least data from the intensity distribution and data representing the portion of the illumination area occupied by the solar cell. In accordance with some embodiments, the computer system is further configured to be capable of performing the following operations: calculating a current density when the reference cell is located at the initial location; calculating a respective current density when the reference cell is located at each successive location; and dividing the current density at each successive location by the current density at the initial location of the reference cell, wherein the results of the dividing operation for locations which at last partially overlap with the solar cell are used to calculate the expected current factor. In addition, the system may further comprise means for moving the light source, wherein the reference cell and the solar cell are disposed at different levels relative to the test plane, and the computer system is further configured to be capable of performing the following operations: controlling the means for moving the light source to move the light source from a first position whereat the test plane is level with the solar cell to a second position whereat the test plane is level with the reference cell, wherein operations (b) and (c) are performed while the light source is in the second position; controlling the means for moving the light source to move the light source, after operations (b) and (c) have been performed, from the second position to the first position; after the light source has been moved from the second position to the first position, receiving measurement data representing measurements of current produced by the reference cell while the light source is in the first position and the reference cell is at the initial location; and while the reference cell is at the initial location, calculating a ratio of the respective currents produced by the reference cell while the light source is in the first and second positions respectively, wherein the expected current factor calculated in operation (f) is also based in part on the ratio.

Other aspects of solar simulator systems having means and methods for compensating for spatial non-uniformities within the optical beam are disclosed below.

BRIEF DESCRIPTION OF THE DRAWINGS

FIG. 9 is a diagram representing a side view of a reference cell which is positioned in a plane different than the test plane in which the solar cells are positioned. The dashed line represents the test plane, the row of bars below the test plane represent the solar cells, and the single bar above the test plane represents the out-of-focus initial location of the reference cell.

FIG. 10 is a diagram representing a side view of the reference cell and the solar cells in the same positions which they occupied in FIG. 9, but showing a new position of the test plane at the level of the reference cell resulting from movement of the light source.

FIGS. 11A and 11B are diagrams representing a side view of the solar cells in the same positions which they occupied in FIG. 10, with the test plane at the level of the reference cell, but with the reference cell shown in respective positions during X-Y scan recording of light intensity values output by the reference cell.

Reference will hereinafter be made to the drawings in which similar elements in different drawings bear the same reference numerals.

DETAILED DESCRIPTION

To facilitate an understanding of the various embodiments disclosed in detail below, the general architecture and operation of a known solar simulator system will be described with reference to FIGS. 1-4.

A single-junction solar cell is formed of two semiconductor layers in facing contact with each other at a semiconductor junction. When illuminated by the Sun or other light source, the solar cell produces a voltage between the semiconductor layers. Advanced (i.e., multi-junction) solar cells may include more than two semiconductor layers and their respective pairwise semiconductor junctions. The various pairs of semiconductor layers of the multi-junction solar cells form subcells, with each subcell tuned to a specific spectral component of the Sun to maximize the power output.

Solar simulator systems are used for testing solar cells. Solar simulator system (also referred to as solar simulators) emulate sunlight by replicating the spectral distribution of natural sunlight. In a typical method for testing solar cells, a solar simulator illuminates a test solar cell on an illumination plane with a light beam within a specific bandwidth range. Since solar cells are designed for a number of different applications (i.e., some cells are designed to operate in space while others are designed for terrestrial use), a solar simulator evaluates the performance of each type of cell by using the same solar spectrum in which that cell is designed to operate. The voltage and current parameters as well as overall conversion efficiency of the solar cell are monitored and measured.

It is desirable for a solar simulator to accurately replicate the real-world environment for a solar cell in a test environment set-up. Furthermore, it is desirable for a solar simulator to have the flexibility to adjust the solar spectrum projected onto an illumination plane, where the solar cell being tested will be located. The solar spectrum may be adjusted by selecting the quantity and range of wavelengths (bands) that impinge upon the illumination plane.

Figure 1:
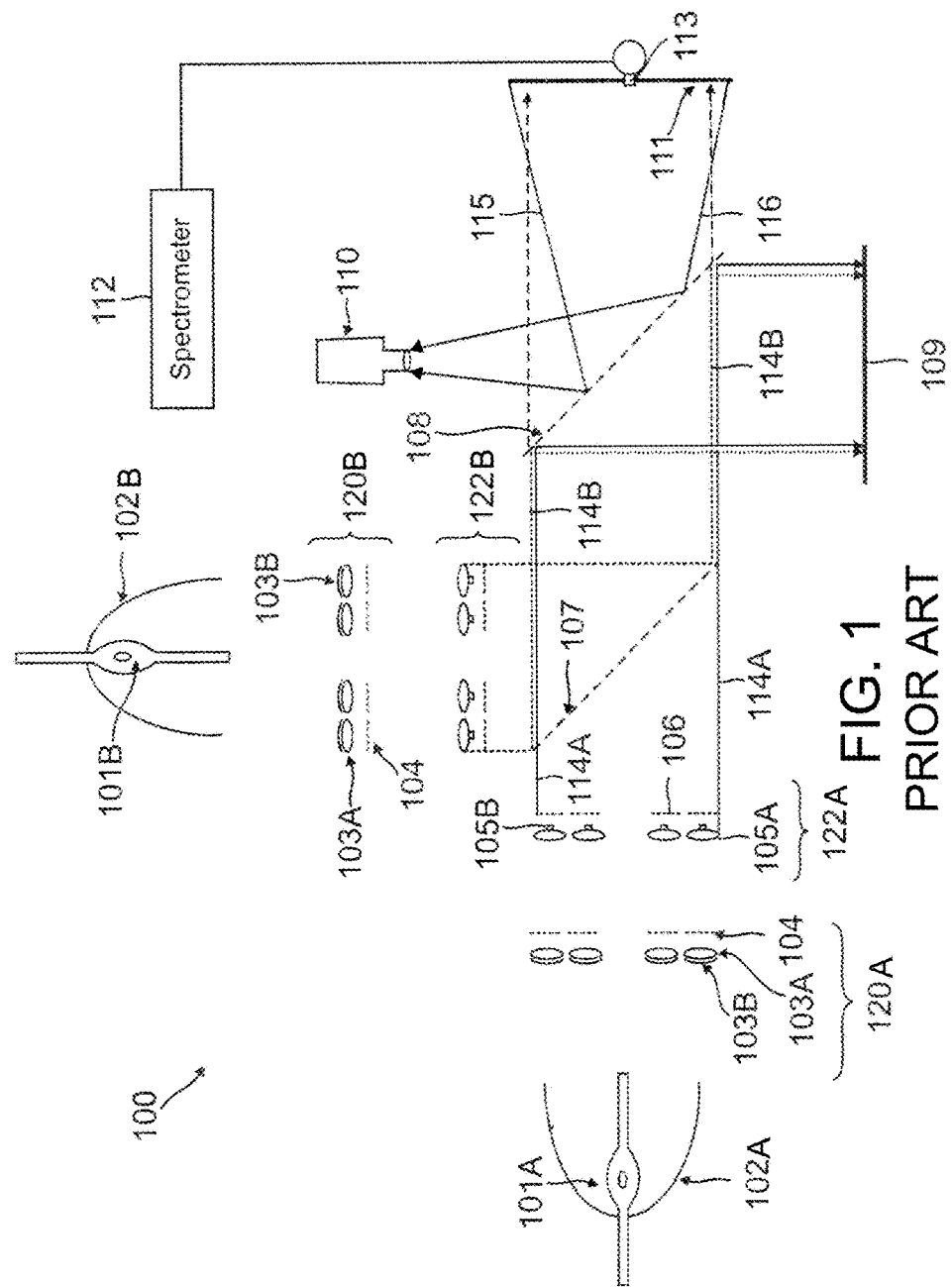
FIG. 1 is a diagram representing optical components of a known solar simulator system.

A solar simulator system in accordance with the embodiments depicted in FIG. 1 incorporates two independent light sources, multiplexed into the same optical beam path, each of which is broken up into many smaller beamlets having respective beamlet paths. However, the compensation techniques disclosed herein can be used in systems having only one lamp and systems having more than two lamps. For each lamp, the smaller beamlet paths are individually filtered spectrally and then re-imaged to overlap at the illumination plane at some point in space. Appropriate imaging lenses, optical filters and irises are put in place to be able to adjust any portion of the spectrum from 100% to 0% of the input light. This makes the system adjustable within various spectral bands.

FIG. 1 is a diagram representing components of a known solar simulator 100 for testing solar cells. The solar simulator 100 may include two independent light sources, lamps 101A and 101B. Lamps 101A and 101B both provide input light for an illumination plane 109 (also referred to herein as "test plane"), where a solar cell (not shown) to be tested will be located. The lamps 101A and 101B may be of the same type or different, for example, xenon, mercury, incandescent, metal vapor or any other type of lamp.

The optical elements used with lamp 101B are similar in function to the optical elements used with lamp 101A, except the optics with lamp 101B may filter wavelengths of light different than the wavelengths of light filtered by the optics for lamp 101A.

Lamps 101A and 101B generate respective beams of light (referred to herein as "optical beams") that are reflected from respective reflectors 102A and 102B. Each reflector 102A, 102B includes a reflective internal surface that collects and collimates the light emanating from the source, i.e., lamp 101A or 101B, and redirects the optical beam in the desired direction. The boundaries of an optical beam 114A from lamp 101A are indicated by a pair of parallel solid lines (best seen in FIG. 3), while boundaries of an optical beam 114B from lamp 101B are indicated by a pair of parallel dotted lines. The angled dashed lines in FIG. 3, which are disposed at 45-degree angles with respect to the boundaries of optical beam 114A, represent a dichroic mirror 107 and a reflector mirror 108 respectively.

Referring back to FIG. 1, the light from lamp 101A is passed through a spectral filter assembly 120A and then through a re-imaging assembly 122A placed downstream from the spectral filter assembly 120A. Similarly, the light from lamp 101B is passed through a spectral filter assembly 120B and then through a re-imaging assembly 122B placed downstream from the spectral filter assembly 120B.

Figure 2:
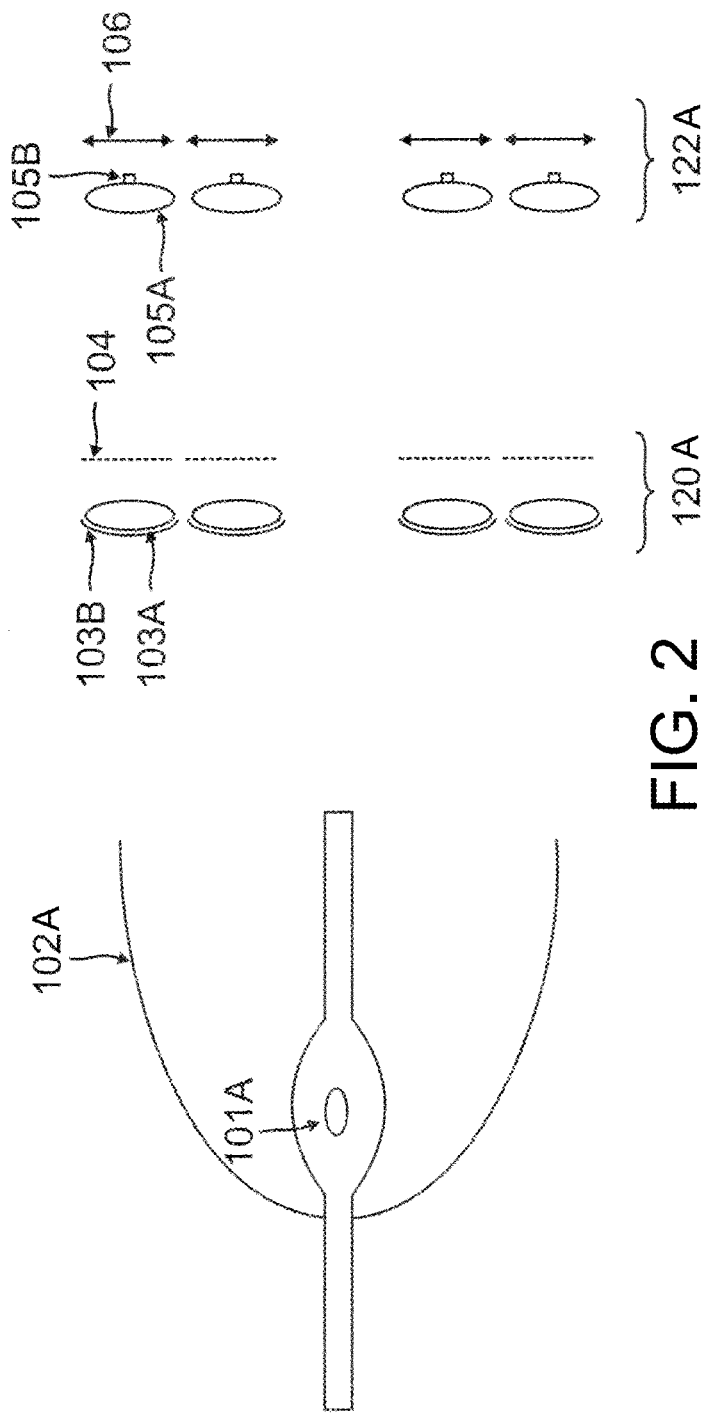
FIG. 2 is a diagram representing some of the optical components of the solar simulator system depicted in FIG. 1 on a magnified scale.

The optical path for optical beam 114A from lamp 101A passes through spectral filter assembly 120A, which spectrally filters the light that passes therethrough. As best seen in FIG. 2, spectral filter assembly 120A comprises a plurality of field lenses 103A, wherein each field lens 103A has a band-pass coating 103B associated with it. Spectral filter assembly 120A may also include uniformity masks 104. FIG. 2 shows an example of how the components of spectral filter assembly 120A and re-imaging assembly 122A are aligned with respect to lamp 101A. The components of spectral filter assembly 120B and re-imaging assembly 122B may be aligned with respect to lamp 101B in a similar manner.

Referring back to FIG. 1, in each of the spectral filter assemblies 120A and 120B, field lenses 103A split the input beam into "N" separate beamlets, one for each field lens. Field lenses 103A also modify the divergence of the individual beamlets to fully fill the next lens in the simulator system 100. The shape of field lenses 103A determines the shape of the final illuminated beam footprint. In different embodiments, field lenses 103A can be round, square, rectangular or hexagonal lenses disposed in a hexagonal pattern.

As best seen in FIG. 2, each field lens 103A includes a band-pass coating 103B that acts as a band-pass filter allowing transmission of only selected wavelengths (i.e., a selected band of wavelengths) of light. The fact that each of the individual beam paths have only one "band" (or wavelength) of light allows the user to vary the intensity of a specific individual beamlet to increase or decrease the portion of the light spectrum that impinges on the illumination plane 109. Band-pass coatings 103B may be provided on one or more surfaces of the field lens 103A. In one embodiment, field lenses 103A and band-pass coatings 103B are chosen in matched pairs to maintain a spectral balance across the illumination plane area.

The beamlets exiting from field lenses 103A may also pass through respective uniformity masks 104. Masks 104 are positioned downstream from field lenses 103A in the simulator system 100. Masks 104 are used to balance brightness level. Masks 104 are spatially varying transmission elements and are designed to compensate for the natural intensity variations across the area of the optical beam. The spatial resolution of mask 104 is higher than the spatial resolution of the illumination plane 109 (i.e., solar cell). In one embodiment, each field lens 103A is provided with its own uniformity mask 104. In one embodiment, mask 104 may be made of glass with a reflective aluminum coating.

Referring again to FIG. 1, after the spatially balanced beam passes through masks 104, the respective beamlets impinge on respective re-imaging assemblies 122A and 122B respectively placed downstream from the spectral filter assemblies 120A and 120B. According to one embodiment, each re-imaging assembly includes a plurality of projection lenses 105A, each projection lens 105A having an obscuring dot 105B and an associated iris mechanism (hereinafter "iris") 106. Projection lenses 105A re-image the beamlets coming through field lenses 103A to the illumination plane 109. Projection lenses 105A are positioned laterally such that all the individual images overlap at illumination plane 109.

Each iris 106 controls the magnitude of light coming from its associated projection lens 105A. As an iris 106 opens and closes, it increases or decreases the amount of light that is allowed to proceed along that optical beam path. By controlling the level to which an iris 106 opens (or closes), the spectral bandwidth of light impinging (i.e., incident) on illumination plane 109 can be adjusted.

Irises 106 may be used in matched pairs arranged symmetrically across the center of the optical configuration. In one embodiment, irises 106 are motorized to provide an automatic adjustment of the spectral content of the lamp light impinging on illumination plane 109.

For solar simulators in which the irises 106 cannot close completely due to their construction, an obscuring dot 105B is placed on the center of each projection lens 105A, as seen in FIG. 2. Obscuring dot 105B is a miniscule coating of a reflective material on a projection lens 105A that allows 0% transmission to the illumination plane 109. The reflective material used for obscuring dot 105B may be aluminum or any other material that blocks transmission of light. The size of obscuring dot 105B depends on the type and structure of iris 106. In one embodiment, obscuring dot 105B is only slightly bigger in diameter then the smallest diameter of iris 106 in the closed position. Iris 106, when used with obscuring dot 105B, allows adjusting the spectral assembly transmission from 0% to 100%.

Figure 3:
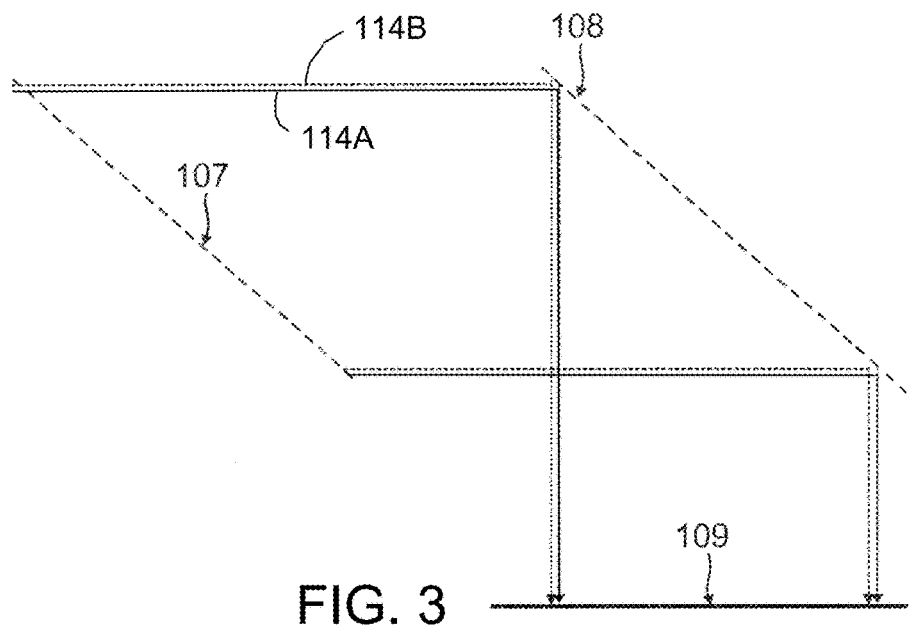
FIG. 3 is a diagram representing the lamp-produced optical beams incident on the illumination plane after interacting with the mirrors of the solar simulator system depicted in FIG. 1.

Referring again to FIG. 1, the respective optical beams from re-Imaging assemblies 122A, 122B impinge upon a dichroic mirror 107. Dichroic mirror 107 (represented by a dashed line in FIG. 3) allows transmission of light having a wavelength in a certain range and reflects light having wavelengths outside that range. Dichroic mirror 107 may be designed to transmit light from lamp 101A that is transmitted through any of the field lenses 103A (with their band-pass filters 103B) in spectral filter assembly 120A and to reflect similar light received from lamp 101B. As seen in FIG. 3, dichroic mirror 107 is aligned with reflector mirror 108 to overlap the transmitted beam from lamp 101A with the reflected beam from lamp 101B on the illumination plane 109. In one embodiment, dichroic mirror 107 when used with lamp 101A allows visible light to pass through and reflects infra-red light. When used with lamp 101B, dichroic mirror 107 reflects infra-red light onto illumination plane 109 and allows the visible light to pass through.

Figure 4:
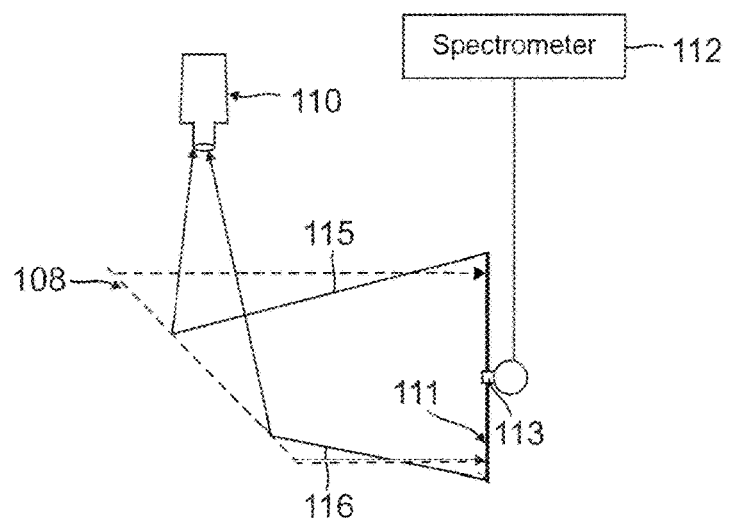
FIG. 4 is a diagram representing a diagnostic plane and associated components of the solar simulator system depicted in FIG. 1.

In the embodiment shown in FIG. 1, the optical beam reflected from dichroic mirror 107 impinges on a reflector mirror 108. Reflector mirror 108 reflects the majority of the beam (for example, 99%) toward the illumination plane 109 (as seen in FIG. 3), while the remaining portion (for example 1%) is transmitted to a diagnostic plane 111 (as seen in FIG. 4). The reflected beam is projected to the illumination plane 109 for testing, while the transmitted beam (to the diagnostic plane 111) is used for diagnostics of the overall simulator system 100. At the illumination plane 109, the solar cell (not shown) is tested and its results are monitored.

In one embodiment, diagnostic plane 111 is spaced from lamps 101A and 101B by the same distance that illumination plane 109 is. The diagnostic plane 111 may comprise a flat plate (normal to incoming light) that is covered with a uniform "white" scattering material which scatters the incoming light in a Lambertian distribution scatter.

In accordance with the embodiment depicted in FIG. 1, a monitoring system may be used at the diagnostic plane 111 to monitor the optical content on the diagnostic plane 111. The monitoring system may include an integrating sphere 113 and/or a camera 110 for tracking and analyzing the optical content at diagnostic plane 111. The simulator system uses integrating sphere 113 to assist in measuring the spectral content of light impinging on illumination plane 109. The light from integrating sphere 113 may be sent to a spectrometer 112 and the total spectrum of the illuminating light may be measured and recorded. This spectrum may be used to modify the spectrum of light at illumination plane 109 to a desirable value. Irises 106 may be adjusted to change the light that is passed to illumination plane 109. This allows one to adjust the optical beam based on the solar cell operating environment.

As shown in detail in FIG. 4, the camera 110 may be used to view the diagnostic plane 111. Some of the light scattered by diagnostic plane 111 will go back in the original direction, be reflected by reflector 108, and then be imaged by camera 110. The boundaries of this light are indicated by solid arrows 115 and 116 in FIG. 4. The image from camera 110 provides an accurate map of the intensity distribution seen at the illumination plane 109. The integrated value from camera 110 provides a power measurement for light impinging on illumination plane 109.

Referring again to FIG. 1, the specific design of field lenses 103A and projection lenses 105A may be determined in conjunction with all the other optical elements of the simulator to provide a smooth, nearly uniform illumination at the illumination plane 109. In one embodiment, irises 106, field lenses 103A, and projection lenses 105A are used in matched pairs arranged symmetrically across the center of the optical configuration.

Each matched pair of irises 106 block a desired quantity of light within a given wavelength. This balances out some of the non-uniformity that occurs when beams hit the illumination plane 109 at a non-normal incidence angle. Each re-imaging assembly 122A, 122B (see FIG. 1) is designed to produce a symmetrical and balanced output beam.

The field lenses 103A with band-pass filters 103B, and the projection lenses 105A with obscuring dots 105B may similarly be arranged in matched pairs placed diametrically opposite to each other. The spectral content of the light within one portion of the beam's cross section is closely matched with the spectral content of the light within the diametrically opposed portion of the beam's cross section.

The movement of irises 106 may be motorized and along with the monitoring system (spectrometer 112 or other sensors). This may be computer controlled to provide a continuous spectral match to virtually any spectrum, either static or variable in time.

The pairs of field lenses 103A and projection lenses 105A split up and re-image the different portions of the optical beams from the two lamps 101A, 101B to overlap at illumination plane 109. This provides for enhanced spatial uniformity and jitter reduction. Also, since the lenses work in matched, balanced pairs, this minimizes non-uniformities that might occur from a non-zero angle of incidence.

The set of optical elements described above performs the function of re-imaging each light source to the illumination plane by breaking each beam up into a number of beamlets and then re-imaging those beamlets to enlarge and overlap them, spatially, at the illumination plane to achieve better spatial uniformity.

Once the solar simulator has been aligned to achieve the best spatial uniformity available, the techniques for compensating for spatial non-uniformities proposed herein can be employed.

In accordance with some embodiments of an improved solar simulator system, the method for compensating for spatial non-uniformities comprises: acquiring a spatial map of the intensity distribution that the solar simulator produces across its illumination plane using one or more reference cells, identifying an area of an arbitrary solar cell within the illuminated area, and then calculating the expected illumination levels for that solar cell in that specific location based in part on the measured reference values acquired during spatial mapping and in part on the respective percentages of area occupied by the solar cell in the respective regions of the subdivided test plane (also referred to herein as "Illumination plane").

In accordance with some embodiments, an X-Y scan is performed across the entire illuminated area using one or more calibrated reference cells and the measured values are recorded as a function of position. The measured values acquired from the reference cell are a function of position in a two-dimensional plane which is parallel to if not coplanar with a test plane (i.e., illumination plane). One reference cell can be used if the solar cell under test is a single-junction solar cell (e.g., silicon). Several different reference cells (also referred to herein as "isotypes") should be used if the solar cell under test is a multi-junction solar call. For example, if a triple-junction solar cell is to be tested, respective isotypes comprising calibrated top, middle, bottom and full reference cells should be used for these array measurements. A "full reference cell" is a calibrated solar cell that is of the same physical/electronic construction of the cells under test. This will allow the user to simulate/measure the effect of the entire cell under test, and not just measure the electrical performance of any individual isotype of the cell under test. This full reference cell will have the same current limitations of the cells under test (limited in current to the least performing junction of the stack of multiple junctions).

The reference cell produces a voltage and supplies electric current to an electrical cable (not shown in the drawings) when illuminated. The current output by the reference cell is measured at each scan position of the reference cell. Then the measured values are transmitted to a computer. These measured values are used to create an X-Y array which maps out the spatial uniformity of the optical beam at the test or illumination plane. In the case where multiple reference cells are used, a respective array of measured values is constructed for each individual reference cell.

More specifically, the process described in the preceding paragraph may comprise the following steps. First, the locations of the reference cell relative to a coordinate system of the illumination plane is determined for use in future measurements. The location where the solar cell under test will be placed is also determined. Typically, the solar cell under test is much larger than the reference cell used for calibration. Typically, the solar cell under test will not fit precisely within the X-Y patterns of the originally performed scan. For the areas where any portion of the footprint of the solar cell under test occupies or overlaps some portion of the regions of the subdivided test plane where the calibration data was acquired, the computer is programmed to calculate the percentage of each X-Y scan region that is covered by the solar cell under test. Using that data, the computer is further programmed to calculate the expected total current from the solar cell under test (relative to the current output by the reference cell at its initial location) by summing the products of the aforementioned area-of-overlap percentages and the respective calibrated current values acquired when the reference cell was positioned (during the mapping process) over the respective regions (of the subdivided test plane) overlapped by the solar cell. This ratio will give the cumulative multiplicative relationship between the current produced by the reference cell in its initial location and total current expected over the area occupied by the solar cell under test for any intensity distribution. If the actual current produced by the solar cell under test differs from the expected current by more than a specified threshold, then a determination may be made that the solar cell under test is not up to standard.

The above-described procedure allows the user to change the size, shape or location of the solar cell under test, while the computer uses the same set of calibration data to recalculate the corresponding cumulative multiplicative relationship for these differences. Additionally, this allows for several different solar cells to be measured across the area of the illumination plane while still maintaining accurate relationships between the one reference cell and any of the areas occupied by the solar cell under test. This enables testing of solar cells having different sizes and shapes.

The mapping provides a spatial map of the intensity distribution across the illuminated area (i.e., at the test plane). Either one type of reference cell can be used for testing single-junction solar cells, or Individual isotypes can be used to perform the same scan and record similar arrays for each isotype for testing multiple-junction solar cells.

Figure 5:
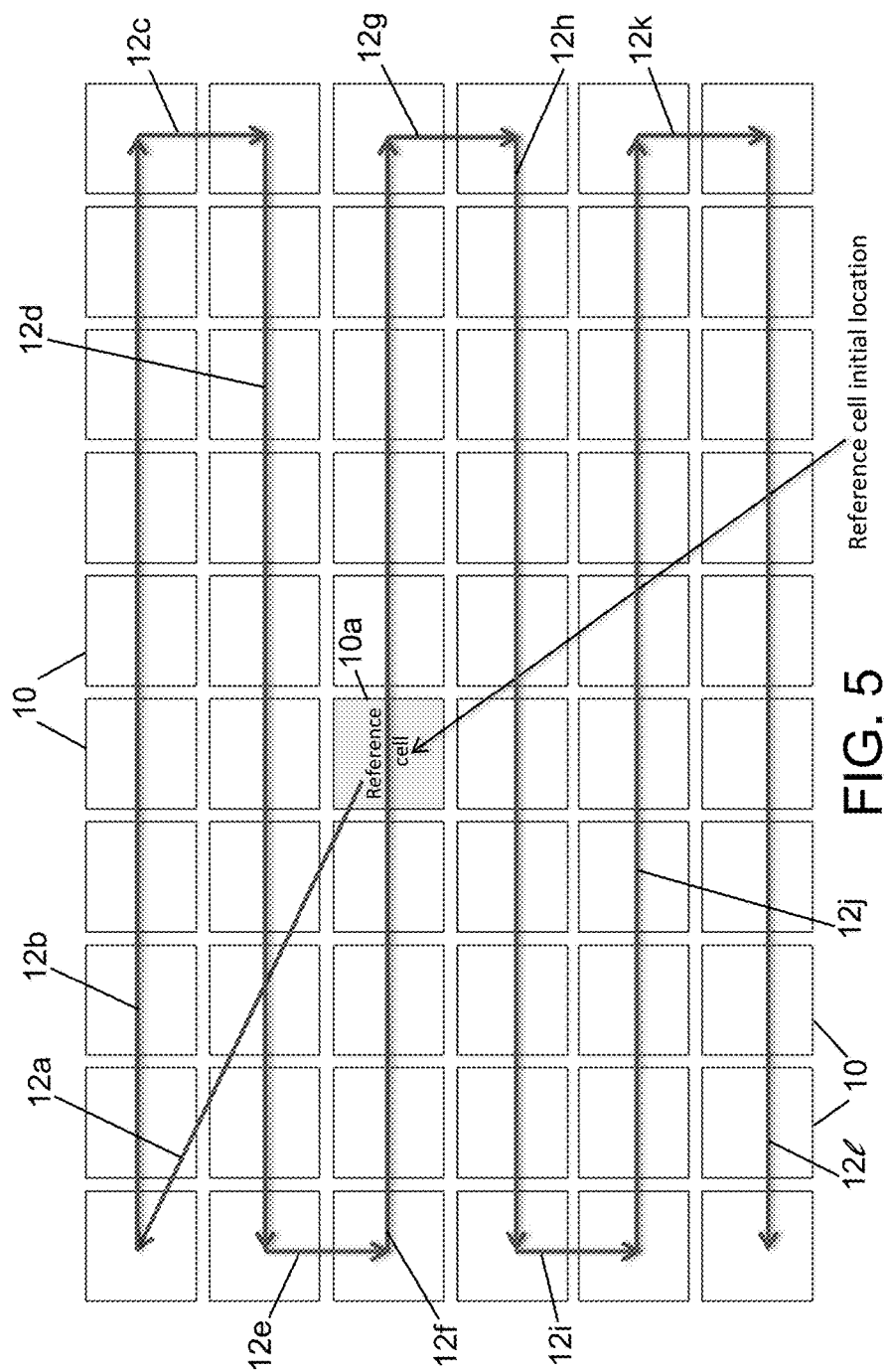
FIG. 5 is a diagram showing a multiplicity of locations of a square reference cell which can be used to map a rectangular illumination area in accordance with one embodiment. The square labeled "Reference cell" represents the initial location of the reference cell, while the arrows indicate the path traveled by the reference cell during the mapping operation.

If multi-junction solar cells are used, and measurements are made with each of the individual isotypes associated with that solar cell, then the user can determine the spectral balance across the entire illuminated area. Areas where the spectral balance is not within the required specifications can be avoided for measurement purposes FIG. 5 shows a multiplicity of locations 10, arranged in rows and columns, wherein a square reference cell can be used to map a rectangular illumination area in accordance with one embodiment. The square labeled "Reference cell" represents the initial location 10a of the reference cell within the multiplicity of locations 10, while the arrows 12a-12ℓ indicate the path traveled by the reference cell during the mapping operation.

Starting from the reference cell initial location 10a, the reference cell (not shown in FIG. 5) is translated to each of the subsequent locations 10 along the scan path indicated by arrows 12a-12ℓ, mapping out the entire illuminated area. At each subsequent location 10, the current produced by the reference cell when at that location 10 is measured. The measured values for each location 10 are recorded in a tangible non-transitory computer-readable storage medium for use by the computer.

If the reference cell does not have exactly the same size dimensions as the scan step size, the current density (i.e., electric current per unit area of cross section) measured at the center of each scan location 10 will be assigned to the entire scan area (i.e., scan area 16 in FIG. 6) for computational purposes. The reference cell in the embodiment depicted in FIG. 5 is square. In alternative embodiments, the reference cell may have other shapes, such as circular or hexagonal.

By dividing the current density at each individual location by the current density at the reference cell initial location 10a, the computer can provide an array of values representing a scaled map of the illumination distribution of the entire illuminated area. This means that if you measure the intensity at one location (e.g., the reference cell initial location 10a), then the computer can calculate the intensity at all other locations of the illumination area by comparing those measured values to the measured value corresponding to the one location.

Figure 6:
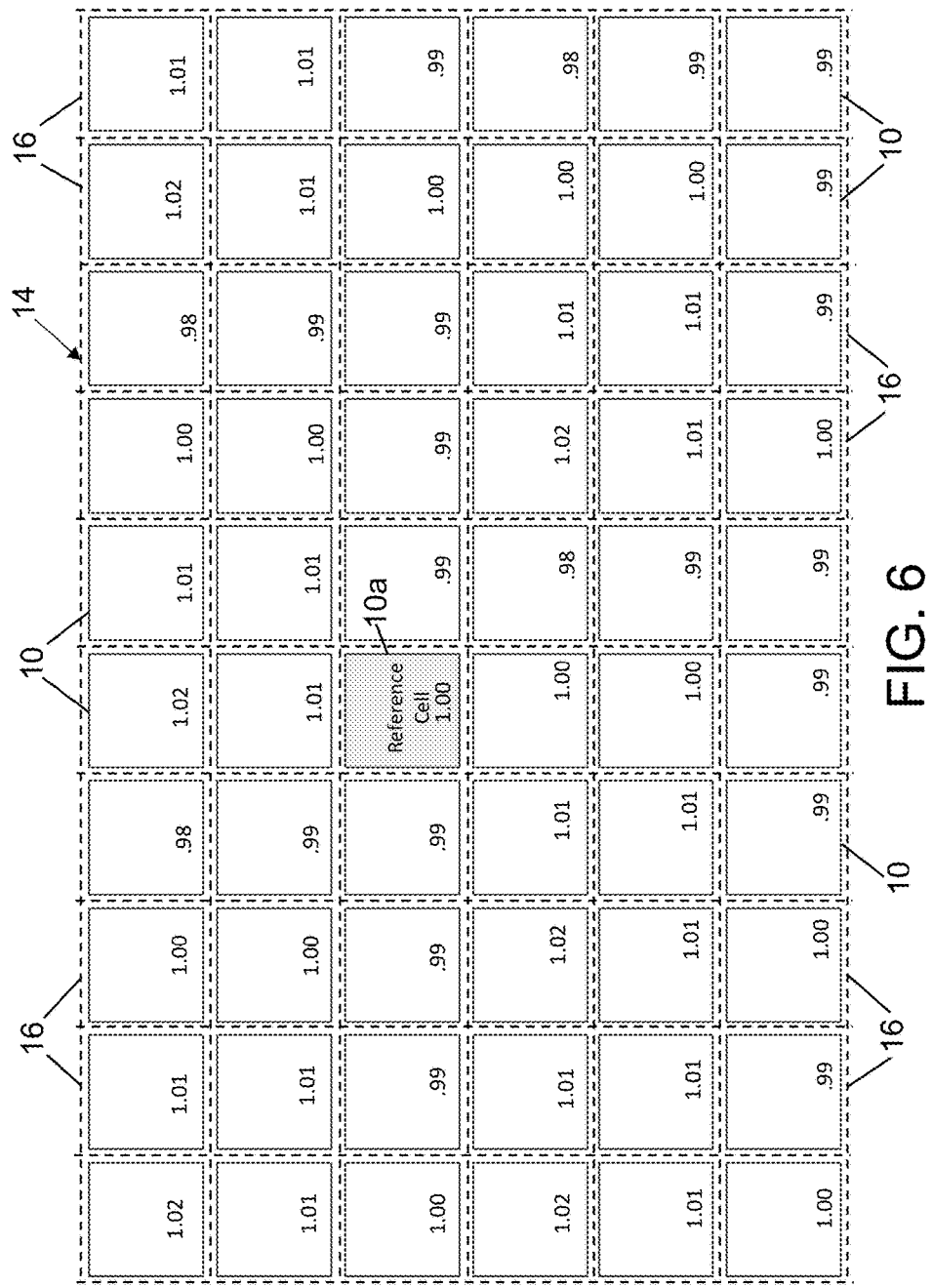
FIG. 6 is a diagram showing the same multiplicity of locations of a square reference cell depicted in FIG. 5 and further showing the rectangular illumination area subdivided into contiguous square regions (indicated by dashed lines) which are arranged in rows and columns. The numbers are the normalized values for each measured location compared to the reference cell value.

FIG. 6 shows the same multiplicity of locations 10 of a square reference cell that are depicted in FIG. 5 and further shows the rectangular illumination area 14 subdivided into contiguous square regions 16 (indicated by dashed lines) which are arranged in rows and columns. The numbers inside the squares are examples of normalized measured current density values for each reference cell location 10 compared to the reference current density value measured while the reference cell was at its initial location 10a.

At the end of those measurements, the reference cell should be returned to the X, Y position (e.g., the reference cell initial location 10a) where the reference cell will be used for future measurement.

If solar cells of different sizes and shapes are placed anywhere in the illuminated area for testing, then the cross section of those solar cells can be calculated based on the amount of the scan step area that each solar cell covers.

Figure 7:
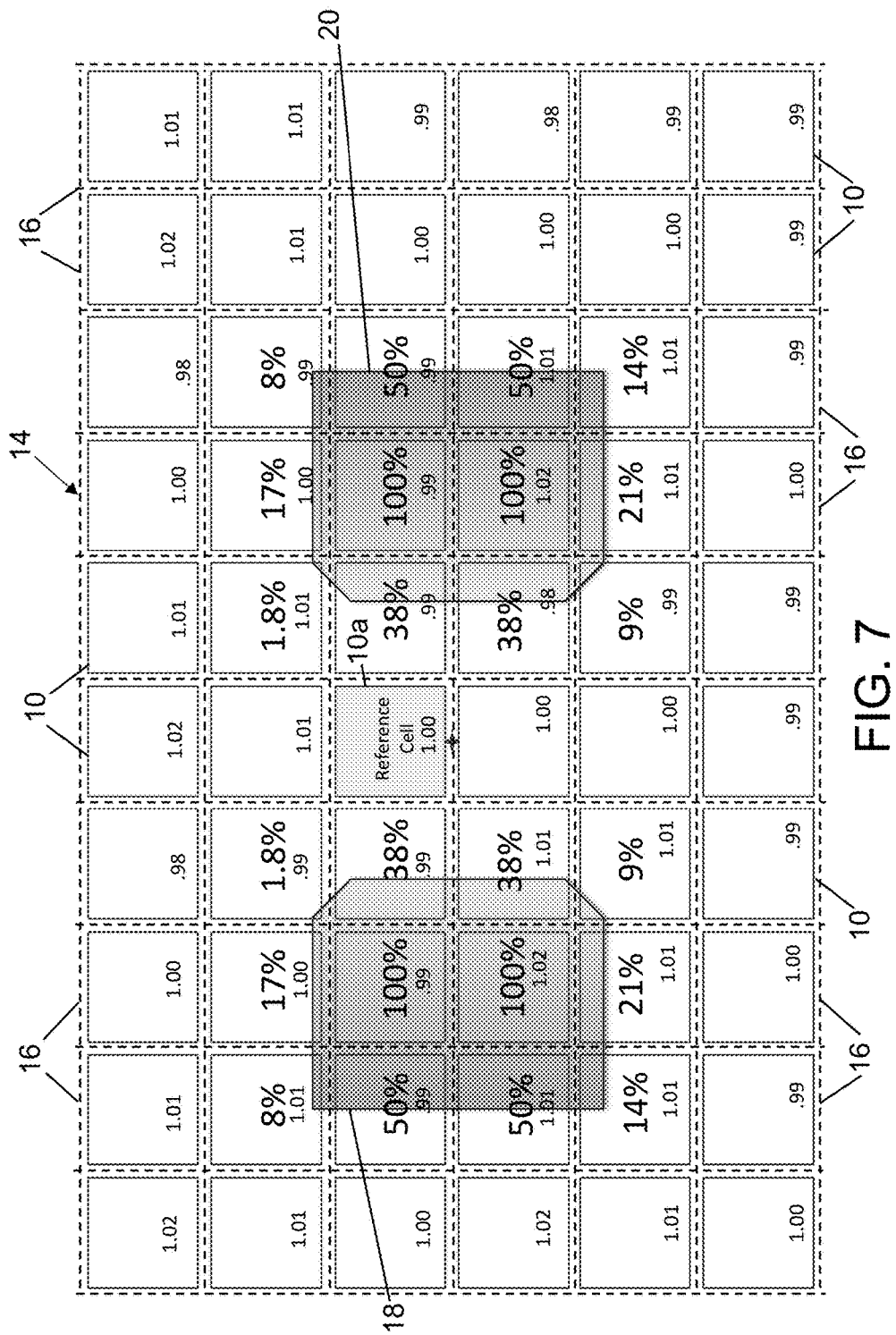
FIG. 7 is a diagram showing a pair of six-sided solar cells occupying respective portions of the subdivided illumination area depicted in FIG. 6. The smaller numbers again are the normalized values for each measured location compared to the reference cell value, while the larger numbers correspond to the percentage of each square subdivision that is occupied by the respective six-sided solar cell.

FIG. 7 shows a pair of six-sided solar cells 18 and 20 placed in the subdivided illumination area 14 depicted in FIG. 6, each solar cell occupying a respective area. (The reference cell in this example is placed at the initial location 10a.) The smaller numbers inside the squares are examples of normalized measured values for each reference cell location 10 compared to the reference value measured while the reference cell was at its initial location 10a, while the larger numbers correspond to the percentage of each square region 16 that is occupied by the respective six-sided solar cell. By multiplying the percentages by the respective normalized measured values and then summing the resulting products, the computer can calculate the value of the expected current density that each solar cell 18 and 20 under test should produce in response to the optical beam impinging on those cells compared to the measured value of the current density produced by the reference cell at its initial location 10a.

For the solar cell 18 on the left, the following Expected Current factor is computed: Expected Current=(0.08*1.01)+ (0.17*1.00)+(0.018*0.99)+(0.5*0.99)+(1.0*0.99)+ (0.38*0.99)+(0.5*1.01)+(1.0*1.02)+(0.38*1.01)+ (0.14*1.01)+(0.21*1.01)+(0.09*1.01). The sum of these products equals the magnitude of the expected current of solar cell 18 relative to the measured value produced by the reference cell while at its initial location 10a.

For the solar cell 20 on the right, the following Expected Current factor is computed: Expected Current=(0.018*1.01)+(0.17*1.00)+(0.08*0.99)+(0.38*0.99)+(1.0*0.99)+(0.5*0.99)+(0.38*0.98)+(1.0*1.02)+(0.5*1.01)+(0.09*0.99)+(0.21*1.01)+(0.14*1.01). The sum of these products equals the magnitude of the expected current of solar cell 20 relative to the measured value produced by the reference cell while at its initial location 10a.

Figure 8:
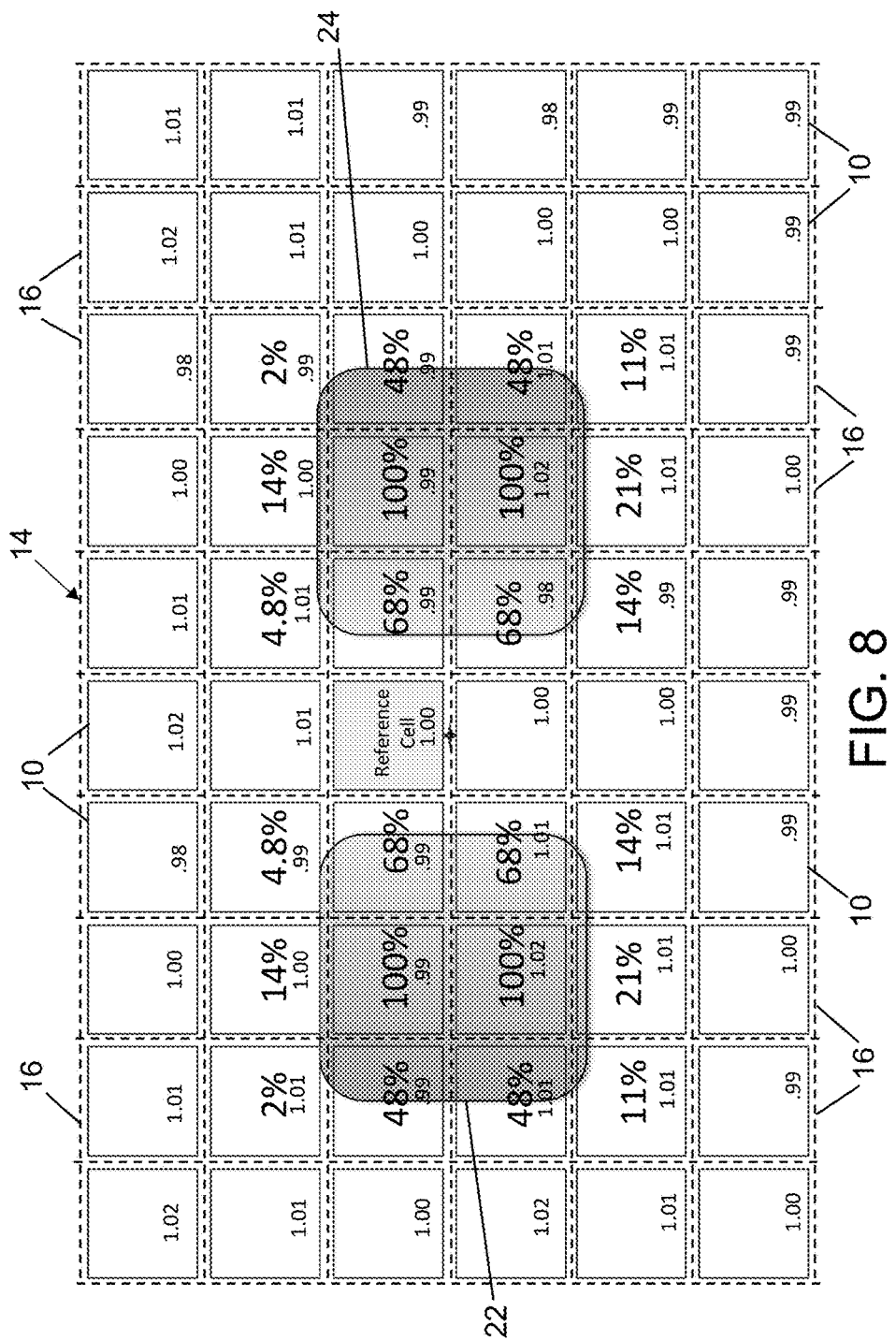
FIG. 8 is a diagram showing a pair of substantially square solar cells (having four rounded corners) occupying respective portions of the subdivided illumination area depicted in FIG. 6. The smaller numbers again are the normalized values for each measured location compared to the reference cell value, while the larger numbers correspond to the percentage of each square subdivision that is occupied by the respective substantially square solar cell.

Solar cells of different shapes, sizes or locations can use the same scan map shown in FIG. 6 to determine the expected current from each individual solar cell FIG. 8 shows a pair of substantially square solar cells 22 and 24 (having four rounded corners) placed in the subdivided illumination area 14 depicted in FIG. 6, each solar cell occupying a respective area. (Again the reference cell in this example is placed at the initial location 10a.) Again the smaller numbers inside the squares are examples of normalized measured values for each reference cell location 10 compared to the reference value measured while the reference cell was at its initial location 10a, while the larger numbers correspond to the percentage of each square region 16 that is occupied by the respective substantially square solar cell. By multiplying the percentages by the respective normalized measured values and then summing the resulting products, the computer can again calculate the value of the expected current density that each solar cell 22 and 24 under test should produce in response to the optical beam impinging on those cells compared to the measured value of the current density produced by the reference cell at its initial location 10a.

For the solar cell 22 on the left, the following Expected Current factor is computed: Expected Current=(0.02*1.01)+(0.14*1.00)+(0.048*0.99)+(0.48*0.99)+(1.0*0.99)+(0.68*0.99)+(0.48*1.01)+(1.0*1.02)+(0.68*1.01)+(0.11*1.01)+(0.21*1.01)+(0.14*1.01). The sum of these products equals the magnitude of the expected current of solar cell 22 relative to the measured value produced by the reference cell while at its initial location 10a.

For the solar cell 24 on the right, the following Expected Current factor is computed: Expected Current=(0.048*1.01)+(0.14*1.00)+(0.02*0.99)+(0.68*0.99)+(1.0*0.99)+(0.48*0.99)+(0.68*0.98)+(1.0*1.02)+(0.48*1.01)+(0.14*0.99)+(0.21*1.01)+(0.11*1.01). The sum of these products equals the magnitude of the expected current of solar cell 24 relative to the measured value produced by the reference cell while at its initial location 10a.

In some cases, the reference cell is not in the same plane as the cells under test, i.e., the reference cell is slightly higher/closer or lower/farther away from the source than the test plane of the solar cells. The method proposed herein for compensating for spatial non-uniformities in solar simulators may further comprise a technique for calculating the expected illumination value of a reference cell that is not in the same plane as the plane of the solar cells under test.

In the case of focus compensation, the measurements of the current produced by the reference cells should be done in the illumination plane, i.e., the plane of the solar cells under test. At the end of those measurements, the reference cells should be returned to the X, Y position where these reference cells will be used for future measurement. First, a measurement should be taken at that "Z" (focus) position. Then the light source of the solar simulator should be moved to the new "Z" (focus) position that is to be used for the future reference measurements. This movement makes the reference cells closer or further away from the light source, corresponding to a higher or weaker signal for each reference cell. The ratio of these sets of numbers will be used to further correct the values of the reference cells in relation to the areas of the solar cells under test FIG. 9 is a diagram representing a side view of a reference cell 30 which is positioned in a different plane (out of focus) than the test plane 34 in which the solar cells under test are positioned. The dashed line represents the test plane 34, the row of bars below the test plane 34 represent the solar cells 32 in their respective positions, and the single bar above the test plane 34 represents the out-of-focus initial position of the reference cell 30. Although FIG. 9 shows the reference cell 32 positioned above the test plane 34, the focus technique disclosed herein can also be applied when the reference cell 30 is below the test plane 34.

In accordance with one embodiment of the focus compensation technique, the light source (not shown in FIGS. 9-11) is moved such that the test plane 34 is now at the level of the reference cell 30. FIG. 10 is a diagram representing a side view of the reference cell 30 and the solar cells 32 in the same cell positions which they occupied in FIG. 9, but showing a new position of the test plane 34 at the level of the reference cell 30 resulting from movement of the light source.

The reference cell 30 is then scanned over the illumination area in the manner previously described and the currents produced by the illuminated reference cell 30 are recorded for each scan location, thereby providing the intensity distribution in the displaced test plane 34. FIGS. 11A and 11B are diagrams representing a side view of the solar cells 32 in the same positions which they occupied in FIG. 10, with the test plane 34 at the level of the reference cell 30, but with the reference cell 30 shown in respective positions during X-Y scan recording of light intensity values output by the reference cell 30. The measured values of the current produced by the reference cell 30 during the X-Y scan process are recorded for each X, Y position.

Upon completion of the X-Y scan process, the reference cell 30 is returned to its original center location and the focus (i.e., the location of the test plane 34) is adjusted back to its original (in focus) position (as seen in FIG. 9) by moving the light source back to it original "in focus" position. The measured value of the current produced by the reference cell 30 when the test plane 34 is in the "in focus" position is then recorded.

The current values measured at both test plane positions (i.e., out of focus and in focus) are recorded in a tangible non-transitory computer readable storage medium and used later by the computer to calculate a ratio which can be used to correct the values acquired in the previous measurements. Since the reference cell 30 was moved out of the test plane 34, the reference cell 30 will provide slightly different readings than it would provide if it were still in the test plane 34.

The calibration process is initiated by the system user and involves calculations performed by a computer. One location in the illuminating beam is chosen as the point where the spectrum will be balanced. (This X,Y location is now defined as the location in the illuminating beam that all other measurements are done with respect to). Once the system is spectrally balanced, then the user chooses which reference cell (isotypes or full cell) to use for all calculations. For example, assume that the user chooses the "Full Cell" (isotype) as the reference cell. All of the potential reference cells are bolted to the top stage of an X-Y scanning table, so they can be moved to any arbitrary location in the illuminating beam. The scan (grid) parameters are inputted by the user and the computer-controlled X-Y stages send the platform to that initial location. The computer then initiates the scan process. An array is populated with the data that is recorded at each location. This is the non-uniformity array that will be used in the future processes. This array maps out the subtle differences in the illuminating beam strength as a function of position. The next step in the process that the user chooses to calculate the percentage of each grid that is covered by the DUT cell of choice.

Figure 12A:
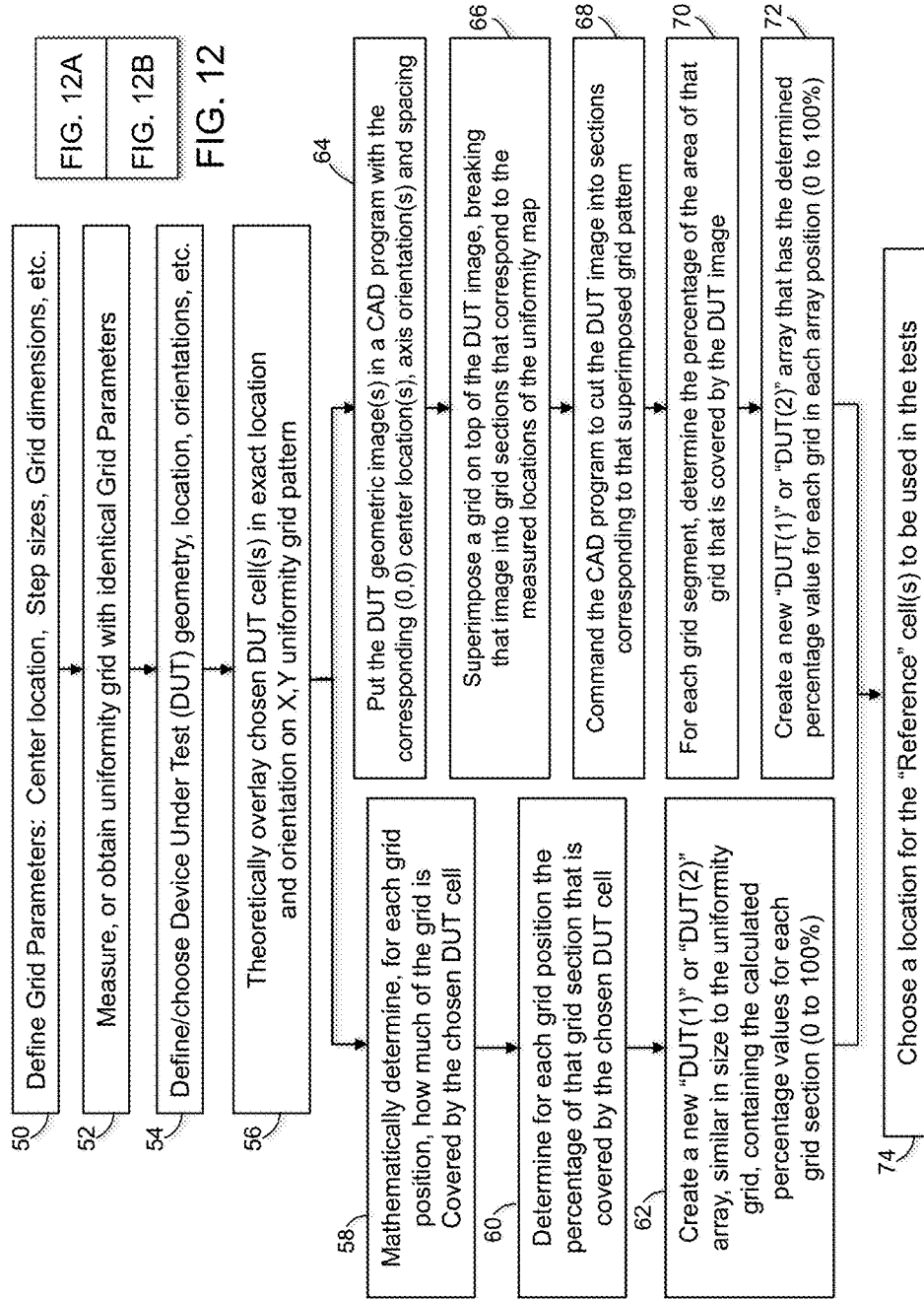
FIG. 12 (comprising FIGS. 12A and 12B) is a flowchart identifying steps of an algorithm that uses software to take a measured spatial non-uniformity map and accurately predict what the mathematical relationship would be between the measured value from a calibrated reference cell (at an arbitrary position in the illuminating beam) to any device under test (DUT) cell (of a known size and shape) at a different location in the illuminating beam.
Figure 12B:
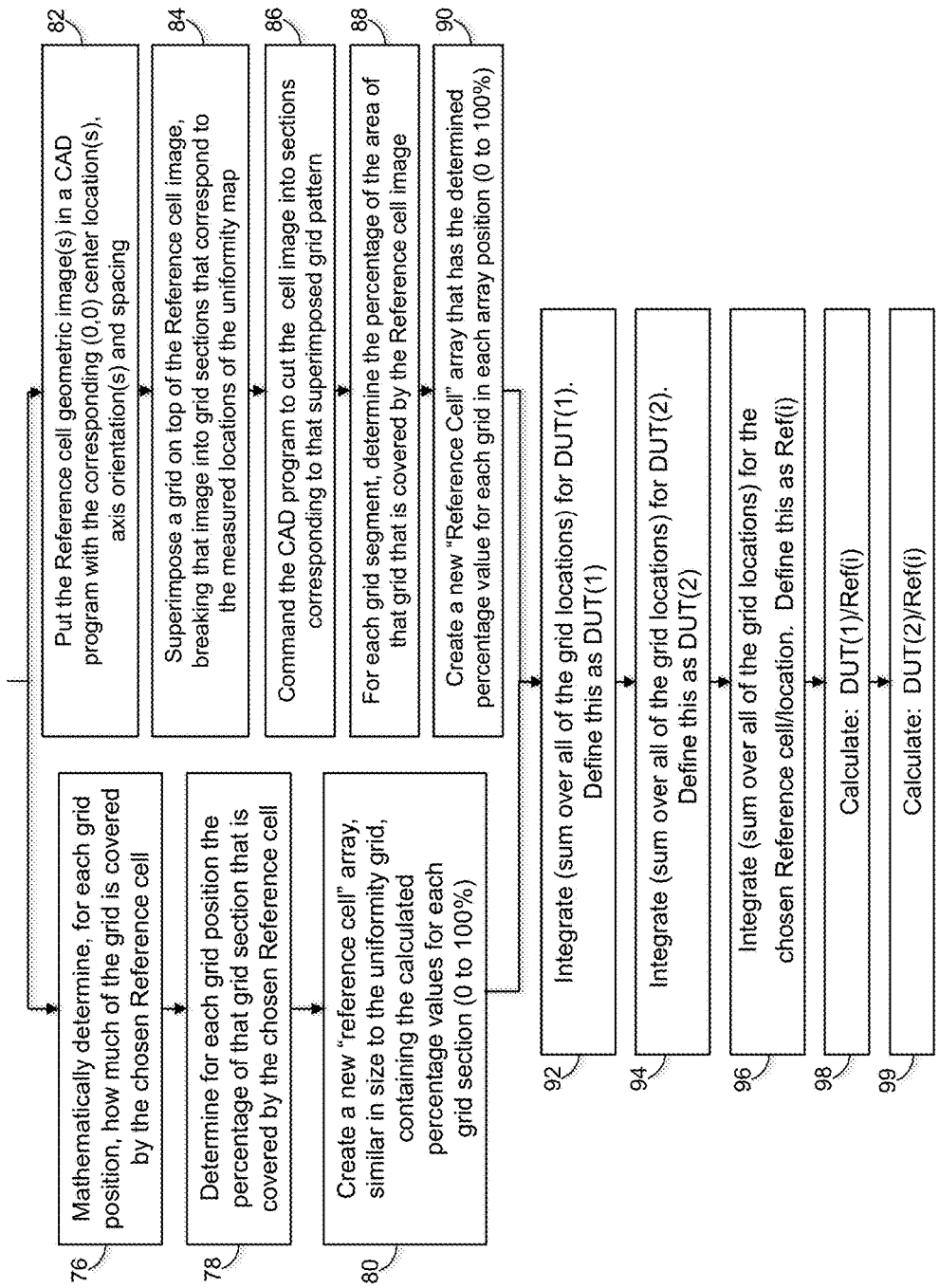

The software/algorithm shown In FIGS. 12A and 12B describes the approach that is proposed to take the measured spatial non-uniformity map and accurately predict what the mathematical relationship would be between the measured value from a calibrated reference cell (at an arbitrary position in the illuminating beam) to any device under test (DUT) cell (of a known size and shape) at a different location in the illuminating beam.

First, the user chooses what size/resolution map to create by defining grid parameters such as center location, step sizes, and grid dimensions (step 50). Then the spatial uniformity map with identical grid parameters is measured (or obtained) to define the spatial intensities of the illuminating beam as a function of (X,Y) position (step 52). Next the user identifies which types of cells are to be tested by defining/choosing a DUT geometry, location, orientations, etc. (step 54). This uniquely determines the size, shape, position(s) and active area of the cell(s) to be tested. The computer then theoretically overlays the chosen DUT cell(s) with exact position and orientation on the X,Y uniformity grid pattern (step 56).

Next the user may use either a technique to mathematically calculate the percentages of the grid space covered by the cell, which first technique is usable for simple cell shapes, or a technique to calculate the percentages of the grid space covered by the cell using CAD software, which second technique is useful for complex cell shapes.

If the technique for simple cell shapes is chosen, the computer mathematically determines, for each grid position, how much of the grid is covered by the chosen DUT cell (step 58). Then the computer determines for each grid position the percentage of that grid section that is covered by the chosen DUT cell (step 60). Next a new "DUT(1)" or "DUT(2)" array, similar in size to the uniformity grid, is created (step 62). This array contains the calculated percentage values for each grid section (0 to 100%). Then the user chooses a location for the reference cell(s) to be used in the tests (step 74). They can be of a different size or shape than the DUT cells or from the cell that was used to make the uniformity grid map.

Referring now to FIG. 12B, the computer (still executing the simple-cell-shape technique) then mathematically determines, for each grid position, how much of the grid is covered by the chosen reference cell (step 76). For each grid position, the percentage of that grid section that is covered by the chosen reference cell is determined (step 78), Then a new "reference cell" array, similar in size to the uniformity grid and containing the calculated percentage values for each grid section (0 to 100%), is created (step 80).

Still referring to FIG. 12B, the computer integrates (sum over all of the grid locations) for DUT(1) (step 92) and DUT(2) (step 94). The results are defined as DUT(1) and DUT(2) respectively. The computer also integrates (sum over all of the grid locations) for the chosen reference cell location (step 96). These results are defined as Ref(i), where i varies from 1 to n, and n is the number of reference cells.

The computer then calculates the ratio DUT(1)/Ref(i) (step 98). This ratio predicts the current that the user expects to see from cell DUT(1), based on the current that is measured on reference cell Ref(i) due to the spatial non-uniformity of the illuminating beam. Any difference from that expected value will be due to the difference in conversion efficiency of the solar cell DUT(1). The computer also calculates the ratio DUT(2)/Ref(i). This ratio predicts the current that the user expects to see from cell DUT(2), based on the current that is measured on reference cell Ref(i) due to the spatial non-uniformity of the illuminating beam. Any difference from that expected value will be due to the difference in conversion efficiency of the solar cell DUT(2).

Returning to FIG. 12A, if the technique for complex cell shapes is chosen, the user inputs DUT geometric image(s) into a CAD program with the corresponding (0,0) center coordinate position(s), axis orientation(s) and spacing (step 64). Then a grid is superimposed on top of the DUT image, breaking that image into grid sections that correspond to the measured locations of the uniformity map (step 66). The user then commands the CAD program to cut the DUT image into sections corresponding to that superimposed grid pattern (step 68). For each grid segment, the percentage of the area of that grid that is covered by the DUT is determined (step 70). A new "DUT(1)" or "DUT(2)" array is created that has the determined percentage value for each grid in each array position (0 to 100%). Then the user chooses a location for the reference cell(s) to be used in the tests (step 74), as previously described.

Referring now to FIG. 12B, the user inputs the reference cell geometric image(s) in a CAD program with the corresponding (0,0) center location(s), axis orientation(s) and spacing (step 82). Then a grid is superimposed on top of the reference cell image, breaking that image into grid sections that correspond to the measured locations of the uniformity map (step 84). The user then commands the CAD program to cut the cell image into sections corresponding to that superimposed grid pattern (step 86). For each grid segment, the computer then determines the percentage of the area of that grid that is covered by the reference cell image (step 88). A new "reference cell" array that has the determined percentage value for each grid in each array position (0 to 100%) is created (step 90). The computer integrates for DUT(1), DUT(2) and the chosen reference cell location as previously described (steps 92, 94 and 96 respectively), and then calculates the ratios DUT(1)/Ref(i) and DUT(2)/Ref(i) as previously described (steps 98 and 99 respectively).

Following the calibration procedure, the light source is activated and the currents output by the DUT cell(s) and the isotype reference cell(s) are measured. When these measurements have been completed, the user records two measured currents: the current produced by the chosen isotype and the current produced by the DUT being monitored. Both the chosen isotype and the DUT cell are measured for every measurement and simultaneously for all measurements. (This is done because in some/most cases, the exact location that all the measurements are originally referenced to (the (0,0) location) is not accessible by any cell, or other cells may need to be used to compare their results.) Here is one example of a mathematical process that the user may go through to calculate the measurement data:

For the same setup situations (current into the lamp, lamp alignment, etc.) of the simulator/lamp system, the user knows (has measured) that the reference cell at location (0,0) puts out 100 mA when 1 Sun is illuminated on it. At the chosen isotype location, the user has measured that a slightly different amount of current was generated, because of the spatial non-uniformity of the illuminating beam. For example, assume that the amount of current is 102 mA As time goes on, the user can continually look at the chosen isotype to measure its current. The user knows that he/she will always want that current to be 102 mA to make sure that the current output at the reference cell location is 100 mA. (Note: the illuminating beam does drift as a function of time, and that is why the system user needs to continually monitor the present light level when any new measurements are started.) When the user wants to start a measurement, the user simultaneously monitors the chosen isotype current and the DUT current. Because the DUT cell is typically a different size than the isotype reference cell, one would expect a different amount of current to be generated, along with the fact that there is some small non-uniformity contribution error to these measurements.

Because the user has been able to map out the non-uniformity and map out what non-uniformities are associated with the area being used by the DUT cell, the user now knows that the DUT cell should have, for example, 16.74 (arbitrary number chosen) times more current than is being generated by the chosen isotype cell. The user also knows that the current output by the chosen reference isotype is, for example, 5× higher than the reference current output by the reference cell at the reference position (0,0). If any temporal variations have occurred in the illuminating beam, then the user can correct for those variations too.

Using the foregoing process, the user can reference all measurements (DUT(1), DUT(2), etc.) back to the calibrated single reference cell at the coordinate location (0, 0). This compensates for (static) spatial non-uniformities and temporal fluctuations in the illuminating beam. If the user measures that the DUT cell is producing slightly higher or lower currents than were expected, then the user can calculate all the appropriate performance parameters typical for solar cell measurements. If the corrected DUT cell measurement value is 2.2% higher than what is expected (compared to the absolute calibration numbers of the reference cell at the coordinate location (0,0)), then the appropriate values can be calculated based on the calibration numbers provided with the reference cell.

Figure 13:
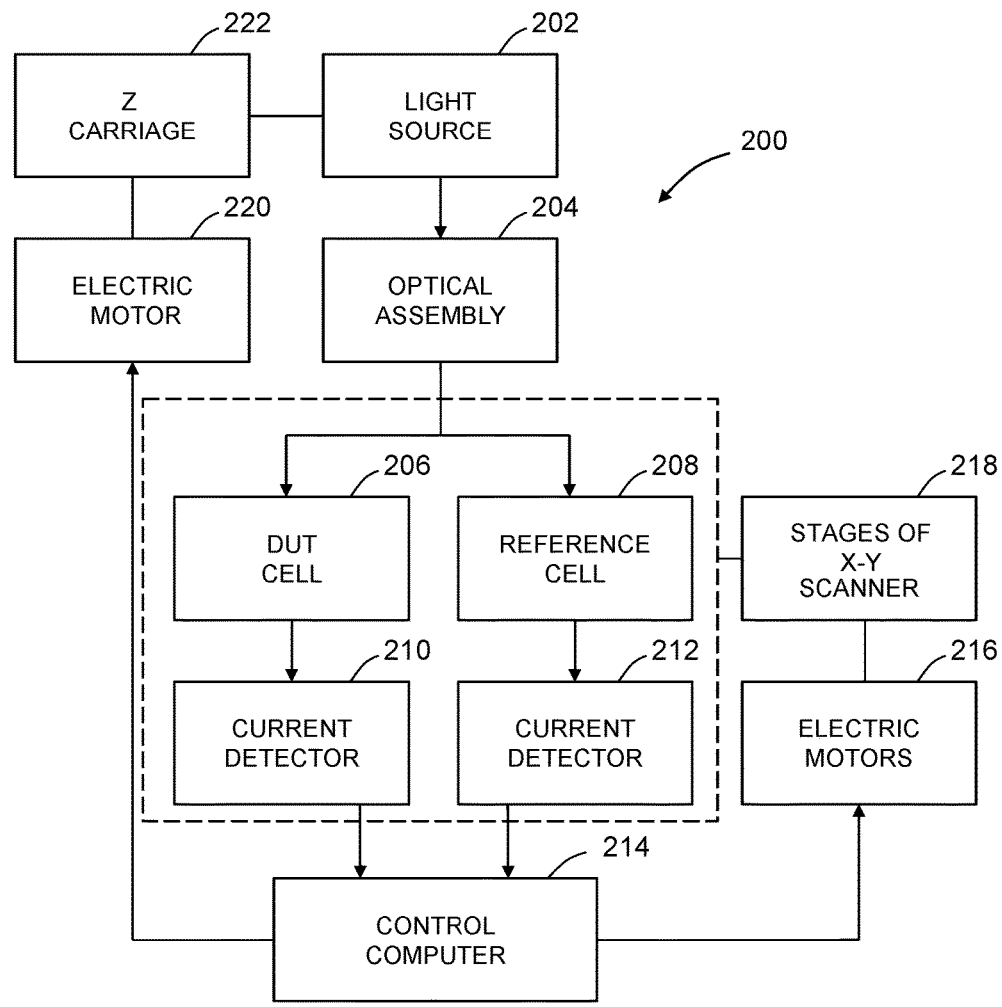
FIG. 13 is a block diagram identifying some components of a solar simulation system that can be calibrated using the techniques disclosed herein.

In accordance with some embodiments, the solar simulation system can be provided with a non-uniformity-compensating apparatus 200 of a type having the components identified in FIG. 13. The light source 202 is mounted on a Z carriage 222 that is movable in a direction which is normal to the test plane. Translation of the Z carriage 222 in the Z direction is driven by an electric motor 220 that is controlled by a control computer 214. The DUT cell 206, reference cell 208 and current detectors 210, 212 are mounted on one of the two stages of an X-Y scanner 218. The X stage is translatable in an X direction, while the Y stage is translatable in a Y direction. (The X, Y and Z directions are mutually orthogonal.) Translation of the X and Y stages is driven by a pair of electric motors 216 that are also controlled by control computer 212.

An optical beam projected by the light source 202 travels through an optical assembly 204 and then intersects a test plane (not indicted in FIG. 13). DUT cell 206 and reference cell 208 are placed at selected locations in or near the test plane. The reference cell 208 can be moved so that it scans in a plane that is parallel to if not coplanar with the test plane. During measurements, the electric currents output by the DUT cell 206 and reference cell 208 are measured by respective current detectors 210 and 212, which report the results to the control computer 214.

While apparatus and methods for compensating for spatial non-uniformities in solar simulator systems have been described with reference to various embodiments, it will be understood by those skilled in the art that various changes may be made and equivalents may be substituted for elements thereof without departing from the scope of the claims set forth hereinafter. In addition, many modifications may be made to adapt the teachings herein to a particular situation without departing from the scope of the claims.

The process claims set forth hereinafter should not be construed to require that the steps recited therein be performed in alphabetical order (any alphabetical ordering in the claims is used solely for the purpose of referencing previously recited steps) or in the order in which they are recited. Nor should they be construed to exclude any portions of two or more steps being performed concurrently or alternatingly.

The invention claimed is:

1. A method for compensating for spatial non-uniformities in a solar simulator, comprising:
    (a) projecting light from a light source onto an illumination area in a test plane;
    (b) calculating an intensity distribution of the light projected onto the illumination area in the test plane using a reference cell;
    (c) identifying a portion of the illumination area occupied by a first solar cell; and
    (d) calculating an expected current factor for the first solar cell based on at least data from the intensity distribution and data representing the portion of the illumination area occupied by the first solar cell,
    wherein steps (c) and (d) are performed by a computer system.

2. The method as recited in claim 1, wherein step (b) comprises:
    placing the reference cell at an initial location within the illumination area;
    measuring the current produced by the reference cell at the initial location;
    placing the reference cell at successive locations within the illumination area; and
    measuring the current produced by the reference cell at each successive location.

3. The method as recited in claim 2, wherein the successive locations are arrayed in rows and columns across the illumination area.

4. The method as recited in claim 2, wherein the successive locations are located in respective contiguous scan step areas formed by subdividing the illumination area.

5. The method as recited in claim 2, further comprising:
    calculating a current density when the reference cell is located at the initial location;
    calculating a respective current density when the reference cell is located at each successive location; and
    dividing the current density at each successive location by the current density at the initial location of the reference cell,
    wherein the results of the dividing step for locations which at last partially overlap with the first solar cell are used to calculate the expected current factor.

6. The method as recited in claim 4, further comprising:
    (e) determining a portion of the illumination area occupied by a second solar cell; and
    (f) calculating an expected current factor for the second solar cell based on at least data from the intensity distribution and data representing the portion of the illumination area occupied by the second solar cell, wherein steps (e) and (f) are performed by a computer system.

7. The method as recited in claim 6, wherein the first and second solar cells have different sizes.

8. The method as recited in claim 6, wherein the first and second solar cells have different shapes.

9. The method as recited in claim 2, wherein the reference cell and the first solar cell are disposed at different levels relative to the test plane, the method further comprising:
    moving the light source from a first position whereat the test plane is level with the first solar cell to a second position whereat the test plane is level with the reference cell, wherein step (b) is performed while the light source is in the second position;
    moving the light source, subsequent to step (b), from the second position to the first position;
    measuring the current produced by the reference cell while the light source is in the first position and the reference cell is at the initial location; and
    while the reference cell is at the initial location, calculating a ratio of the respective currents produced by the reference cell while the light source is in the first and second positions respectively,
    wherein the expected current factor calculated in step (d) is also based in part on said ratio.

10. The method as recited in claim 1, wherein the first solar cell has a single junction.

11. The method as recited in claim 1, wherein the first solar cell has multiple junctions.

12. A method for compensating for spatial non-uniformities in a solar simulator, comprising:
    (a) projecting light from a light source onto an illumination area in a test plane;
    (b) identifying a portion of the illumination area occupied by a multi-junction solar cell;
    (c) calculating a first intensity distribution of light having wavelengths in a first range projected onto the illumination area in the test plane using a reference cell of a first type;
    (d) calculating a second intensity distribution of light having wavelengths in a second range different than the first range projected onto the illumination area in the test plane using a reference cell of a second type different than the first type;
    (e) calculating an expected current factor for the multi-junction solar cell based on at least data from the first and second intensity distributions and data representing the portion of the illumination area occupied by the first solar cell,
    wherein steps (c), (d) and (e) are performed by a computer system.

13. The method as recited in claim 12, wherein step (c) comprises:
    placing the reference cell of the first type at an initial location within the illumination area;
    measuring the current produced by the reference cell of the first type at the initial location;
    placing the reference cell of the first type at successive locations within the illumination area; and
    measuring the current produced by the reference cell of the first type at each successive location.

14. The method as recited in claim 13, further comprising:
    calculating a current density when the reference cell of the first type is located at the initial location;
    calculating a respective current density when the reference cell of the first type is located at each successive location; and
    dividing the current density at each successive location by the current density at the initial location of the reference cell of the first type,
    wherein the results of the dividing step for locations which at last partially overlap with the multi-junction solar cell are used to calculate the expected current factor.

15. The method as recited in claim 12, further comprising determining a spectral balance across the illumination area in the test plane based on at least the calculations of the first and second intensity distributions.

16. A solar simulator system comprising:
    a light source configured to generate an optical beam;
    optical elements disposed along a path of the optical beam, said optical elements being configured to direct the optical beam onto an illumination area in a test plane;
    a reference cell disposed along the path of the optical beam in or near the test plane;
    a current detector for measuring a current produced by said reference cell when illuminated by the optical beam;
    an X-Y scanner configured to scan said reference cell across the optical beam in a plane generally parallel to the test plane, said X-Y scanner comprising an X stage which is translatable in an X direction, a Y stage which is translatable in a Y direction, and first and second electric motors for driving translation of said X and Y stages; and
    a computer system configured to be capable of performing the following operations:
    (a) controlling said first and second electric motors so that said reference cell is placed at an initial location and successive locations in a plane parallel to the test plane at successive times in accordance with an X-Y scan pattern during the projection of light by said light source;
    (b) receiving measurement data from the current detector representing measurements of current produced in respective X-Y scan regions by said reference cell at the initial and successive locations;
    (c) mapping an intensity distribution of the light projected onto the illumination area in the test plane based on the measurement data;
    (d) calculating a percentage of each X-Y scan region that is covered by a solar cell; and
    (e) calculating an expected current factor for the solar cell based on at least data from the mapping of the intensity distribution and data representing the calculated percentages of each X-Y scan region covered by the solar cell.

17. The system as recited in claim 16, wherein said computer system is further configured to be capable of performing the following operations:
    calculating a current density when said reference cell is located at the initial location;
    calculating a respective current density when said reference cell is located at each successive location; and
    dividing the current density at each successive location by the current density at the initial location of the reference cell,
    wherein the results of the dividing operation for locations which at last partially overlap with the solar cell are used to calculate the expected current factor.

18. The system as recited in claim 16, further comprising a Z carriage that is movable in a direction which is normal to the test plane and a third electric mot or for driving translation of said Z carriage, wherein said light source is mounted to said Z carriage, said reference cell and the solar cell are disposed at different levels relative to the test plane, and said computer system is further configured to be capable of performing the following operations:

controlling said third electric motor to move said light source from a first position whereat the test plane is level with the solar cell to a second position whereat the test plane is level with the reference cell, wherein operations (a) and (b) are performed while said light source is in the second position;

controlling said third electric motor to move said light source, after operations (a) and (b) have been performed, from the second position to the first position;

after said light source has been moved from the second position to the first position, receiving measurement data representing measurements of current produced by said reference cell while said light source is in the first position and said reference cell is at the initial location; and while said reference cell is at the initial location, calculating a ratio of the respective currents produced by said reference cell while said light source is in the first and second positions respectively, wherein the expected current factor calculated in operation (e) is also based in part on said ratio.

* * * * *